(12) United States Patent
Mitsuzumi et al.

(10) Patent No.: US 8,379,496 B2
(45) Date of Patent: Feb. 19, 2013

(54) RECORDING DEVICE, RECORDING METHOD AND PROGRAM

(75) Inventors: Masanori Mitsuzumi, Osaka (JP); Hideaki Kobayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 299 days.

(21) Appl. No.: 12/793,308

(22) Filed: Jun. 3, 2010

(65) Prior Publication Data
US 2010/0312807 A1 Dec. 9, 2010

(30) Foreign Application Priority Data
Jun. 4, 2009 (JP) ................................. 2009-135230

(51) Int. Cl.
*G11B 21/08* (2006.01)
(52) U.S. Cl. ...................................................... 369/30.03
(58) Field of Classification Search .................. None
See application file for complete search history.

(56) References Cited

U.S. PATENT DOCUMENTS

| | | | |
|---|---|---|---|
| 2002/0059287 A1 | 5/2002 | Karasudani et al. | |
| 2005/0278631 A1* | 12/2005 | Kamio | 715/704 |
| 2006/0013562 A1* | 1/2006 | Sugino et al. | 386/95 |
| 2006/0239144 A1* | 10/2006 | Gotoh et al. | 369/47.27 |
| 2008/0145035 A1* | 6/2008 | Murakami | 386/124 |
| 2009/0003383 A1* | 1/2009 | Watanabe et al. | 370/474 |

FOREIGN PATENT DOCUMENTS

| | | |
|---|---|---|
| JP | 2006-285327 | 10/2006 |
| WO | 01/16756 | 8/2001 |

* cited by examiner

*Primary Examiner* — Joseph Haley
*Assistant Examiner* — Henok Heyi
(74) *Attorney, Agent, or Firm* — Hamre, Schumann, Mueller & Larson, P.C.

(57) ABSTRACT

Provided are a recording device, a recording method and a program capable of recording a plurality of types of data files and reproducing, even when data recording is interrupted, data that have been recorded before the interruption. The recording device includes a recording medium control unit 170 for controlling recording and reproduction of data on a recording medium 150 including a data area in which data rows can be recorded as files and a specific area in which management information for the files can be recorded, and a recording control unit 110 for time-divisionally recording, through the recording medium control unit 170, a first data row as a first file and a second data as a second file. The recording control unit 110 reserves an area in the data area and records the first data row in the reserved area in sequence, and when switching from the first data row to the second data row for recording, the recording control unit 110 rewrites the management information corresponding to the end of the first file recorded in the reserved area immediately before the switching such that the first file ends at the end and records the second data row from a location subsequent to the end of the first file in the reserved area.

21 Claims, 10 Drawing Sheets

(a) Before writing video data (b) After reserving FAT (c) After connecting FAT chain (d) After writing video data (a) Before writing audio data (b) When separating FAT chain (c) When replacing FAT chain (d) After writing audio data

RECORDING DEVICE, RECORDING METHOD AND PROGRAM

BACKGROUND OF THE INVENTION

1. Field of the Invention

The present invention relates to a recording device for recording data files on a recording medium and a data file recording method and program.

2. Description of Related Art

In recent years, video data and audio data obtained by a digital camcorder, etc., is recorded on a recording medium, such as a flash memory, and is edited on a personal computer. In this case, each data needs to be recorded in a format conforming to a data format recognizable by the personal computer, and normally, a file system such as FAT (File Allocation Table) or UDF (Universal Disk Format) has been used. In these file systems, in addition to actual data such as video and audio, management information, such as actual data placement information, also is recorded on a recording medium.

For example, in the FAT file system, data is managed in blocks called clusters, and with regard to a file and a directory the file name, the date and time of creation, the file attribute, the file size, the starting cluster and the like can be acquired from information called a directory entry. Further, in a table called the FAT table for managing data placement, information used by the file, such as the locations and the sequence of clusters, is recorded.

Here, when recording a data row as a file in the FAT file system, the placement information in the FAT table needs to be updated every time actual data is recorded in clusters. However, frequent information updates could result in a reduction in the use life of the recording medium when one with limited rewrite cycles, such as a flash memory, is used. For this reason, the management information, such as the FAT table, generally is written on a recording medium at certain intervals after being stored in a memory to a certain extent.

However, when data recording is interrupted suddenly before the management information is recorded on the recording medium as a result of an interruption of power of a recording device or a removal of the recording medium, the placement of the data will be lost because the management information is not present in the medium. Thus, data corresponding to previously recorded management information can be referenced only as a file.

As a data recording method for preventing this problem, JP 2006-285327 A proposes the following method. At the time of initializing a recording medium, a digital data recording area of the recording medium is set as a single unrecorded area file with a chain of continuous clusters. And at the time of data recording, the data is recorded in the continuous cluster chain without recording the management information from beginning to end of the recording, and the amount of the recorded data is recorded in the recording area. Consequently, even when the power supply is interrupted during the data recording, it is possible to reference data up to the data in the cluster recorded immediately before the interruption.

SUMMARY OF THE INVENTION

According to the above-described conventional data recording method, even when data recording is interrupted suddenly due to an interruption of power supply, etc., it is possible to access the data recorded immediately before the interruption, allowing the data to be read out. Although the conventional method is effective in recording one type of files as the digital data recording area of a recording medium is set as a single unrecorded area file, the method is not applicable to time-divisionally recording a plurality of files such as in recording video data and audio data as different files. That is, when time-divisionally recording a plurality of files, file placement information cannot be recorded in advance because the placement of files in the data recording area cannot be known.

With the foregoing in mind, it is an object of the present invention to provide a recording device, a recording method and a program capable of recording a plurality of types of data files and reproducing, even when data recording is interrupted, data recorded up to the interruption.

To achieve the above object, the recording device of the present invention includes a recording medium control unit for controlling recording and reproduction of data on a recording medium including a data area in which data rows can be recorded as files and a specific area in which management information for the files can be recorded, and a recording control unit for time-divisionally recording, through the recording medium control unit, a first data row as a first file and a second data row different from the first data row as a second file. The recording control unit reserves an area in the data area and records the first data row in the reserved area in sequence, and when switching from the first data row to the second data row for recording, the recording control unit rewrites the management information corresponding to an end of the first file recorded in the reserved area immediately before the switching such that the first file ends at the end and records the second data row from a location subsequent to the end of the first file in the reserved area.

Further, the recording method of the present invention is a recording method for time-divisionally recording, on a recording medium including a data area in which data rows can be recorded as files and a specific area in which management information for the files can be recorded, a first data row as a first file and a second data row different from the first data row as a second file. The method includes: reserving an area in the data area and recording the first data row in the reserved area in sequence; and rewriting, when switching from the first data row to the second data row for recording, the management information corresponding to an end of the first file recorded in the reserved area immediately before the switching such that the first file ends at the end and recording the second data row from a location subsequent to the end of the first file in the reserved area.

Furthermore, a non-transitory recording medium storing the program of the present invention is for causing a computer to control a recording control unit for time-divisionally recording, on a recording medium including a data area in which a data row can be recorded as a file and a specific area in which management information for the file can be recorded, a first data row as a first file and a second data row different from the first data row as a second file. The recording control unit is caused to reserve an area in the data area and to record the first data row in the reserved area in sequence, and when switching from the first data row to the second data row for recording, the recording control unit is caused to rewrite the management information corresponding to an end of the first file recorded in the reserved area immediately before the switching such that the first file ends at the end and to record the second data row from a location subsequent to the end of the first file in the reserved area.

DETAILED DESCRIPTION OF THE INVENTION

With the recording device, the recording method and the program of the present invention, even when a sudden interruption occurs at the time of time-divisionally recording the first data row and the second data row as different data rows as the first file and the second file, respectively, the data recorded before the interruption can be referenced, thereby minimizing a loss of recorded data.

Hereinafter, one embodiment of the recording device, the recording method and the program of the present invention will be described with reference to the drawings.

First, the recording device will be described.

Figure 1:
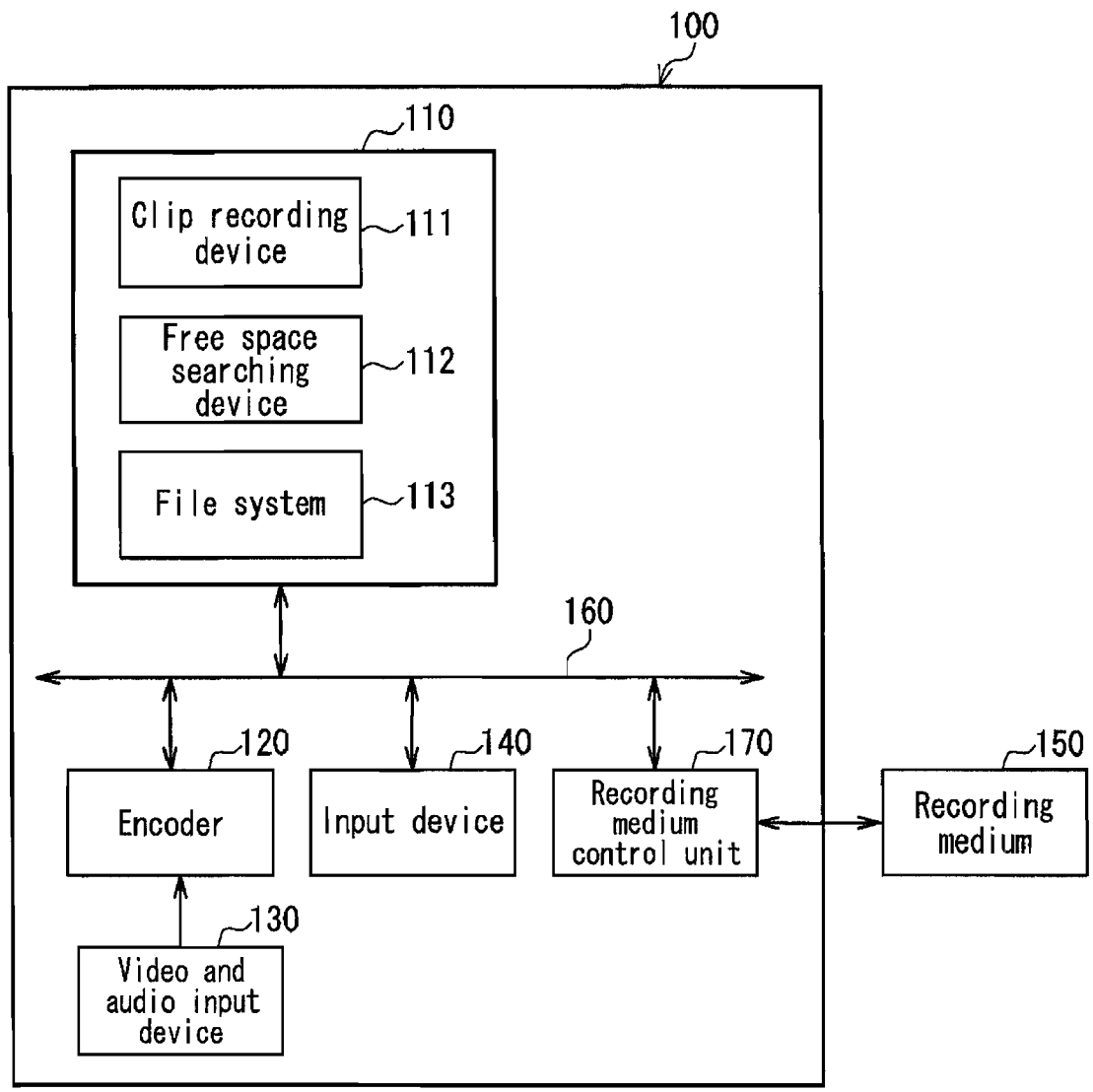
FIG. 1 is a diagram showing a configuration of a recording device according to one embodiment.

As an example of the recording device according to the present embodiment, FIG. 1 is a block diagram showing a configuration of a recording device 100 used in a digital camcorder.

As shown in FIG. 1, the recording device 100 of the present embodiment includes: a system control unit 110 as a recording control unit; an encoder 120 that encodes video and audio signals and is connected to the system control unit 110 through a bus 160; a video and audio input device 130 for inputting video and audio signals; an input device 140 through which a user inputs an instruction to start or stop data clip recording; and a recording medium control unit 170 that is connectable to a recording medium 150 mechanically and electronically and controls data recording on and data reproduction from the recording medium 150.

The system control unit 110 is implemented via a microcomputer (not shown) including a CPU and a memory, for example. The system control unit 110 includes a clip recording device 111, a free space searching device 112 and a file system 113. Each of the devices included in the system control unit 110 is implemented by executing various programs with the CPU.

The clip recording device 111 of the system control unit 110 generates clip management information used for managing various types of information, such as the frame rate and the number of frames of data rows of video data, audio data and the like, and a duration representing a data size in the number of frames, and for correlating the various type of information with each other, and converts the clip management information to an XML (eXtensible Markup Language) formatted file. The file system 113 records the created clip management information on the recording medium 150.

The free space searching device 112 detects whether or not the recording medium 150 has free space necessary for recording data and gathers the location information and the like of the free space.

The file system 113 manages in blocks a file whose data row is recorded and holds the placement information on the blocks of the file. In the present embodiment, an example using the FAT file system will be described.

Video signals inputted through the video and audio input device 130 are compressed by the encoder 120 in sequence to be made into encoded data. The encoded data is stored in a recording buffer memory (not shown). The encoded data stored in the recording buffer memory is read by the clip recording device 111 of the system control unit 110 as a data row, and is converted to an MXF (Material Exchange Format) file. The file is then recorded on the recording medium 150.

Further, audio signals inputted through the video and audio input device 130 are compressed by the encoder 120 to be made into audio data. The data row of the audio data is converted to a WAVE file by the clip recording device 111, and is recorded on the recording medium 150.

The reason why video data and audio data are made into separate files is because video and audio often are edited independently in professional editing tasks at broadcast stations, etc., and normally, video and audio are set as separate files in professional nonlinear editing equipment. A combination of video and audio files from beginning to end of recording is referred to as a clip. Note that a clip also includes a clip management file created by the clip recording device 111. Further, in the present embodiment, video data will be described as a first data row and audio data will be described as a second data row. Thus, the video data file is a first file and the audio data file is a second file.

The recording medium 150 is a medium for recording video and audio and is not limited in anyway in being used in the recording device of the camcorder of the present embodiment. The recording medium 150 includes a data area in which a video data row and an audio data row can be recorded as files and a specific area in which a clip management file as the management information for the video and audio files can be recorded.

As the recording medium 150 for the recording device of the camcorder of the present embodiment, any of various non-transitory memory media including a small and durable SD memory card, a hard disk drive (HDD), a DVD, etc. can be used.

In the present embodiment, although an example with the recording medium 150 being configured to be attachable to/detachable from the recording device 100 will be described, the recording medium 150 may be included in the recording device 100.

Further, in the present embodiment, the recording medium 150 is FAT formatted as an example, and a file is written on the recording medium 150 through the file system 113 updating the FAT table and performing a data writing operation.

A user operates the input device 140 to start and stop clip recording. In a typical camcorder, the input device 140 is an operation button (switch) that is operated to start and stop recording.

Next, with reference to the drawings, a description will be directed to a recording method in the recording device 100 of the present embodiment shown in FIG. 1 when recording video data and audio data as digital data by way of example.

As described above, the system control unit 110 as the recording control unit of the recording device of the present embodiment can be implemented via a computer such as a microcomputer, a special-purpose device with a built-in computer or the like. Further, the function of each functional part, i.e., the clip recording device 111, the free space searing device 112 and the file system 113, is implemented by a CPU included in the computer executing a predetermined program. Therefore, a non-transitory recording medium storing a program for causing the computer to function as each of the functional parts as well as a recording medium recording the program are also included in the present embodiment.

First, with reference to a flow chart of FIG. 2, a description will be given of an overview of a procedure of clip recording performed by the system control unit 110 from start to end.

Figure 2:
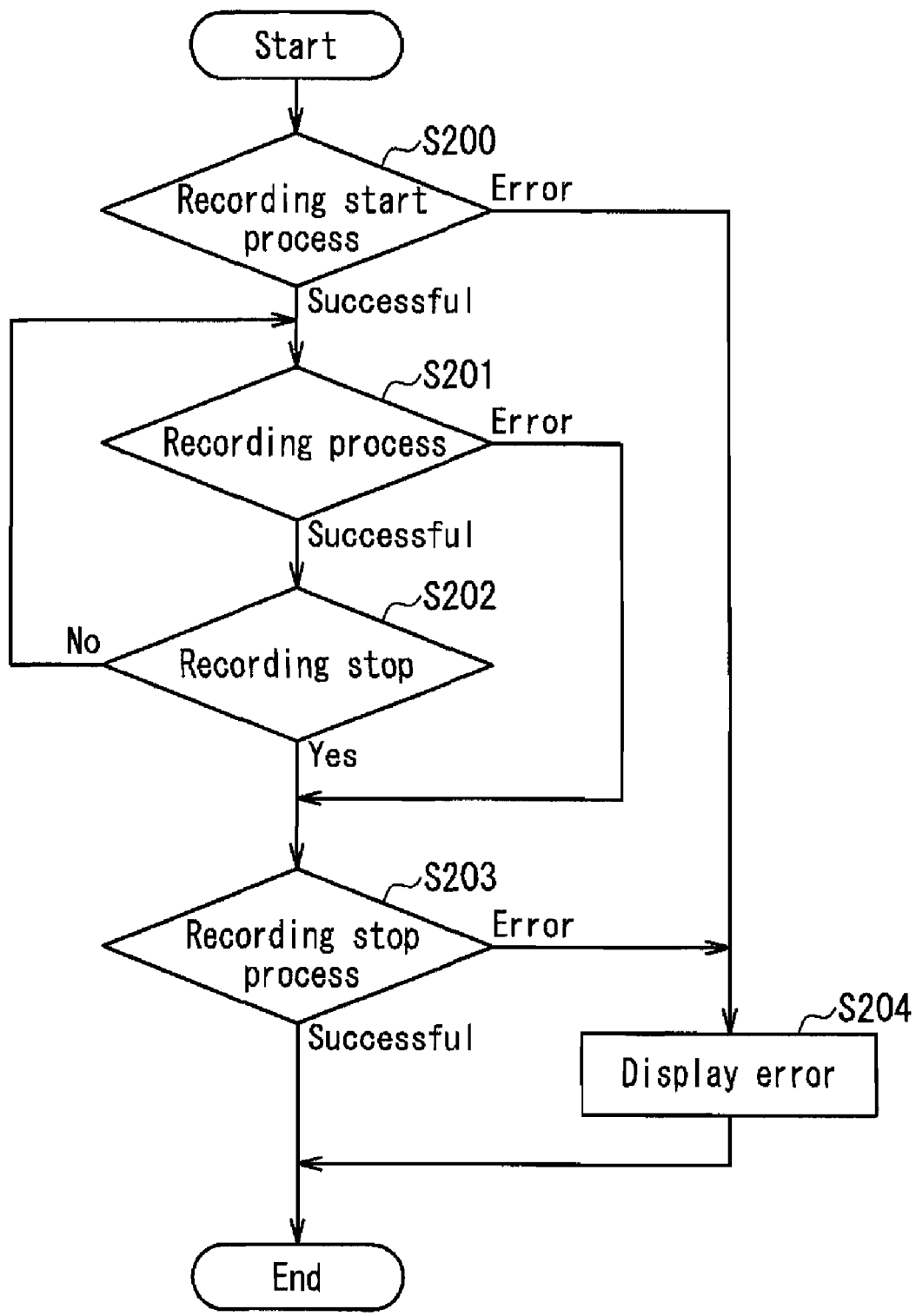
FIG. 2 is a flowchart showing overall details of a recording method according to one embodiment.

As shown in FIG. 2, the system control unit 110 performs a recording start process at the first step S200. The recording start process is a process for detecting whether or not the recording medium 150 has free space for recording a clip management file, a video file and an audio file and creating the clip management file.

When the recording medium 150 does not have free space for recording the data or when an error, such as free space information on the recording medium 150 being unable to comprehend, occurs, the procedure advances to step S204 and the system control unit 110 causes a display device (not shown) such as an LCD to display an error message and ends the clip recording.

When the recording start process has been carried out successfully, the procedure advances to step S201.

At step S201, the system control unit 110 performs a recording process. The recording process is a process in which the clip recording device 111 converts video data and audio data stored in the recording buffer (not shown) to predetermined formats and records the converted video and audio data on the recording medium 150. When an error, such as a problem with the recording medium 150, occurs, the system control unit 110 stores an error code indicating the details of the error in a memory (not shown). The procedure advances to step S203 so as to perform a recording stop process.

On the other hand, when the recording process has been carried out successfully, the procedure advances to step S202.

At step S202, the system control unit 110 checks whether or not the user has given an instruction to stop the recording through the input device 140. When an instruction to stop the recording is not given, the procedure returns to step S201 and the data recording process is repeated.

On the other hand, when it is confirmed at step S202 that the user has given an instruction to stop the recording through the input device, the procedure advances to step S203, at which the system control unit 110 performs the recording stop process.

At step S203, the system control unit 110 performs the recording stop process. Here, the clip management file, the video file and the audio file are closed. When the files have been closed successfully at step S203, the system control unit 110 ends the clip recording.

On the other hand, when an error occurs during the closing at step S203 or when an error code indicating the occurrence of an error during the recording process at step S201 has been stored in the memory (not shown), the procedure advances to step S204, at which the system control unit 110 causes an error message to be displayed and ends the clip recording.

In this way, the video data and audio data encoded by the encoder 120 and the clip management file data are recorded on the recording medium 150.

Next, with reference to the drawings, a description will be directed to details of each step in the recording method of the present embodiment whose overview has been described in FIG. 2.

Figure 3:
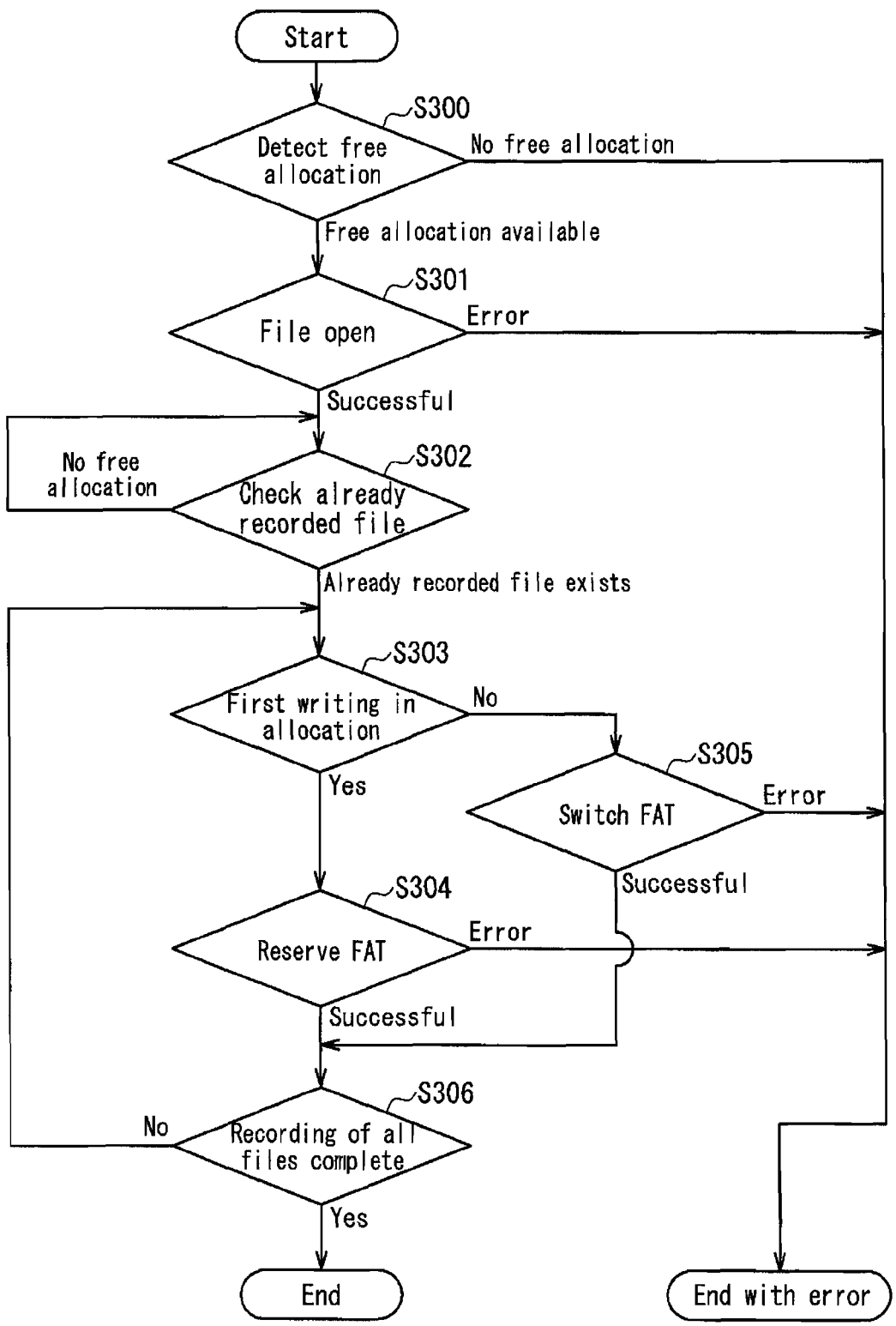
FIG. 3 is a flowchart showing details of a series of processes, including a recording start process, in the recording method according to one embodiment.

FIG. 3 is a flowchart showing a procedure of the recording method of the present embodiment when the user starts video shooting and recording of video data and audio data has become necessary. The procedure shown in FIG. 3 provides the details of the recording start process at step S200 and the subsequent recording process at step S201 in the flowchart of FIG. 2, in which the overview of the recording method of the present embodiment has been shown.

As shown in FIG. 3, in a stage where the user starts video shooting and data rows to be recorded on the recording medium 150 have emerged, in the recording method of the present embodiment, the system control unit 110 first detects free allocation at step S300.

Here, the term "free allocation" refers to unused continuous clusters that are reserved for recording clip data. Normally, at the time of recording large-size data such as video data, the data is recorded in each continuous space having a certain size (allocation size) in consideration of properties of recording media. By recording large-size data in continuous space in this way, it is possible to reduce, when a hard disc drive is used for the recording medium 150, for example, the number of head seeks.

The detection of free allocation is performed by the free space searching device 112. Specifically, the system control unit 110 reads the FAT table from the top and detects free continuous clusters corresponding to the allocation size. When no free allocation is found, in other words, when recording data cannot be recorded on the recording medium 150, the system control unit 110 sets an error code and ends the process.

When free allocation is detected, the procedure advances to step S301.

At step S301, the system control unit 110 performs file opening to create each of the clip management file, the video file and the audio file. During the file opening, the system control unit 110 creates a directory entry for each file.

When the file opening could not be carried out at step S301 due to the occurrence of an error, such as insufficient memory, the system control unit 110 sets an error code and ends the process.

On the other hand, when the file opening has been carried out successfully, the procedure advances to step S302.

At step S302, the system control unit 110 checks whether or not data to be recorded is stored. That is, the system control unit 110 monitors the recording buffer (not shown) to check whether or not encoded data is stored or monitors the memory (not shown) to check whether or not audio data compressed by the encoder 120 is stored, and waits until a certain amount of data is stored. When the data is stored, the system control unit 110 converts, through the clip recording device 111, the encoded data and the audio data to predetermined video and audio data formats, respectively. The procedure advances to S303 so as to record each of the data rows.

At step S303, as the first step of the recording process, the system control unit 110 checks whether or not the data to be recorded is the first data to be written in the allocation.

If so, the procedure advances to step S304. If not, procedure advances to step S305. In the clip recording in the recording method of the present embodiment, the system control unit 110 first records clip management data, and then records video data as the first data row and audio data as the second data row in sequence. Therefore, when recording clip management data, since the clip management data is going to be the first data to be written in the allocation, the procedure advances to step S304. On the other hand, when recording video data and the audio data, since the data of the clip management file has been already recorded in the allocation, the procedure advances to step S305.

When recording clip management data as the first data to be written in the allocation, the system control unit 110 reserves an area in the allocation at step S304 to pre-reserve the FAT table for recording the management information. In the recording method of the present embodiment, by the system control unit 110 pre-reserving the FAT table at the time of data recording, it is possible to prevent a loss of data resulting from power down of the recording device or a removal of the recording medium 150 during the data recording. This reason will be described later.

When an error, such as a problem with the recording medium 150, occurs during the pre-reservation of the FAT table at step S304, the system control unit 110 sets an error code and ends the process.

On the other hand, when the FAT table has been pre-reserved successfully, the system control unit 110 records the data file and the procedure advances to step S306.

Further, when it has been determined at step S303 that the data to be recorded is not the first data to be written in the allocation, in other words, when recording video data and audio data, the system control unit 110 switches FAT table entries at step S305.

When an error, such as a problem with the recording medium 150, occurs during the switching of FAT table entries, the system control unit 110 sets an error code and ends the process.

When the switching of FAT table entries has been carried out successfully, the system control unit 110 records the video file and the audio file subsequent to the switching, and the procedure advances to step S306.

At step S306, the system control unit 110 checks whether or not all of the clip management file, the video file and the audio file have been recorded. When the recording of all of the data stored in the recording buffer as well as the memory has been completed, the system control unit 110 ends the process.

When the recording of the data has not been completed, the procedure returns to step S303 and the system control unit 110 continues file recording following the same procedure.

Now, with reference to FIGS. 4 to 7, a description will be given on the states of directory entries, the FAT table and clusters when performing the recording start process and the recording process in the recording method of the present embodiment shown in the flowchart of FIG. 3.

Figure 4:
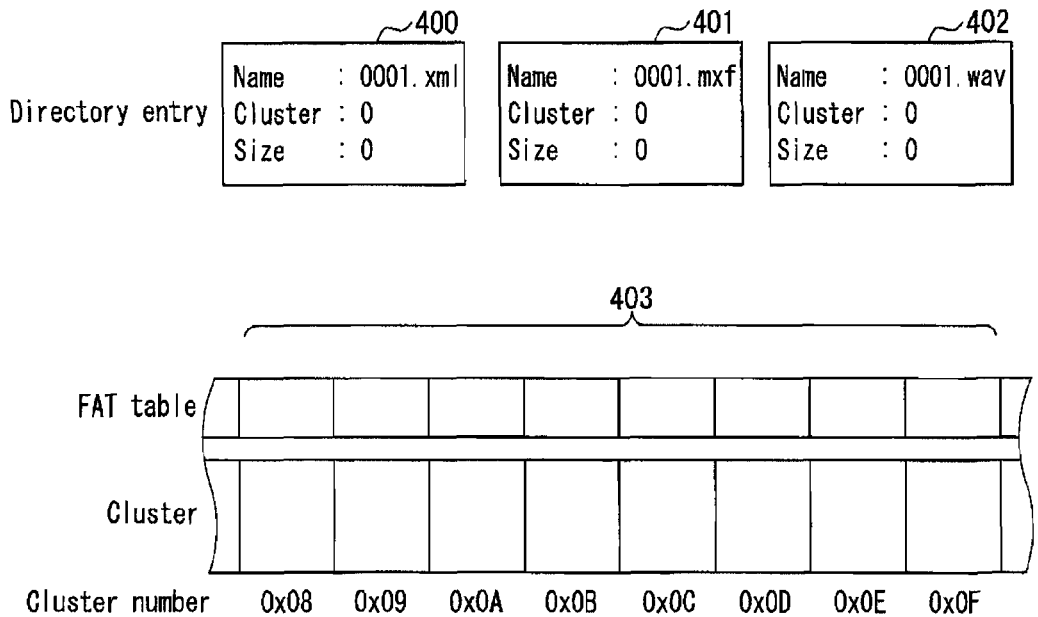
FIG. 4 is an explanatory diagram showing the state of file management information at the time of file opening in the recording method according to one embodiment.

First, FIG. 4 shows exemplary states of directory entries, the FAT table and clusters when the file opening is performed at step S301.

As shown in FIG. 4, in a state where the file opening is performed at step S301, the files only have been opened and the data of each file has not been recorded. Thus, in a directory entry 400 for the clip management file, a directory entry 401 for the video file and a directory entry 402 for the audio file, "0" is shown at both the head cluster and the file size. At this point, these directory entries 400, 401 and 402 are held in the memory (not shown) and they have not been recorded on the recording medium 150.

Further, an allocation area 403 from clusters "0x08" to "0x0F" is the free allocation detected at step S 300. At the stage of the file opening shown in FIG. 4, all of the FAT table entries are unused, and file data is not recorded in any of the clusters.

Next, with reference to FIG. 5, a description will be given on details of the pre-reservation of the FAT table performed in the recording start process, which is presented as step S304 in the flowchart of FIG. 3.

Figure 5:
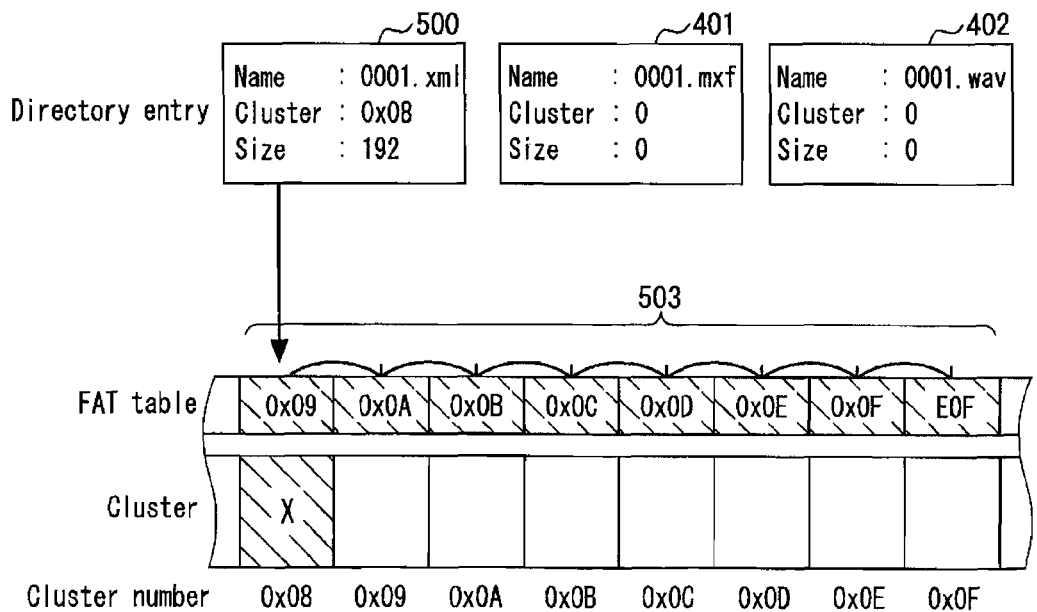
FIG. 5 is an explanatory diagram showing the state of the file management information at the time of start recording a clip management file in the recording method according to one embodiment.

FIG. 5 shows the states of directory entries, the FAT table and clusters at the time of pre-reserving the FAT table. Note that, in FIG. 5, the portions that have been changed from those in FIG. 4, such as a directory entry 500 for the clip management file (400 in FIG. 4), are denoted by new reference numerals and the portions that have not been changed from those in FIG. 4 are denoted by the same reference numerals used in FIG. 4.

At the time of pre-reserving the FAT table shown in FIG. 5, in response to a request to write the clip management data, first, as shown as allocation 503, FAT table entries from one for the top of the area 403 as the free allocation detected at step S300 are connected to each other in sequence to form a FAT table chain. "EOF" representing end-of-file is marked on the end of the allocation area 503. Hereinafter, this stage will be referred to as [Stage 1].

Next, as [Stage 2], the first cluster number "0x08" of the allocation area 503 is recorded in the directory entry 500 for the clip management file as the starting cluster number of the file.

Next, as [Stage 3], clip management data "X" is recorded in the first cluster of the allocation area 503. As a result, the allocation area 503 is entirely treated as the clip management file.

When recording of the data of the clip management file ends, next, the switching of FAT table entries presented as step S305 in FIG. 3 is performed, and then the video file and the audio file are recorded.

Figure 6:
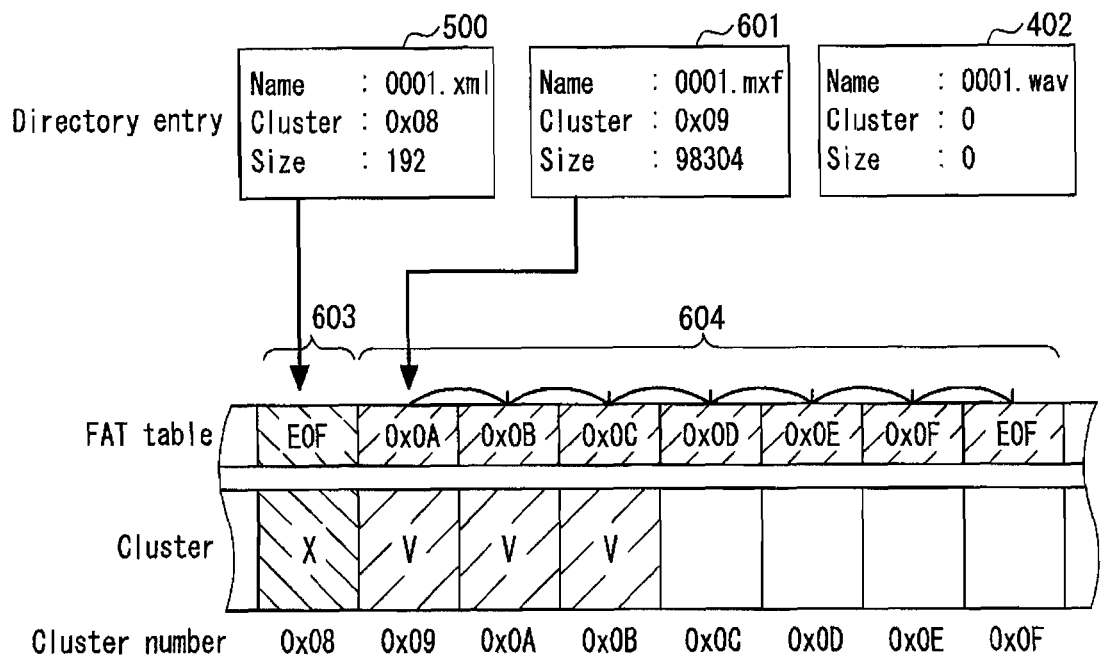
FIG. 6 is an explanatory diagram showing the state of the file management information at the time of start recording a video file in the recording method according to one embodiment.
Figure 7:
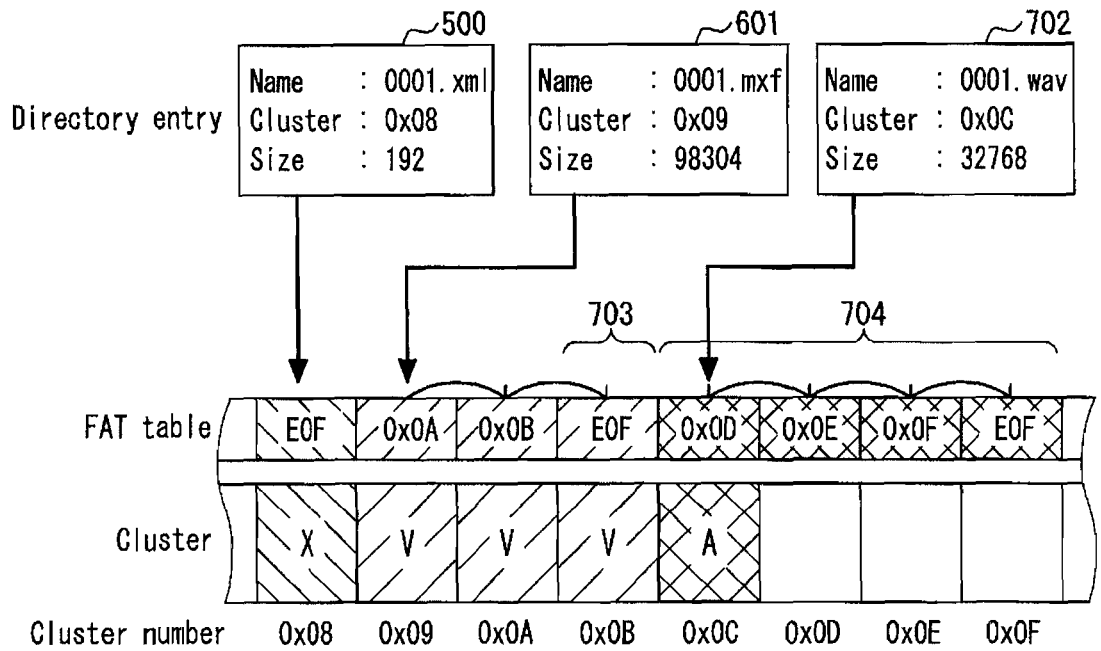
FIG. 7 is an explanatory diagram showing the state of the file management information at the time of start recording an audio file in the recording method according to one embodiment.

FIG. 6 shows the states of directory entries, the FAT table and clusters at the time of recording the video file. Further, FIG. 7 shows the states of directory entries, the FAT table for the allocation and clusters at the time of recording the audio file. Note that the way to see FIGS. 6 and 7 is the same as that of FIG. 5.

In response to a request to write the video data, first, as shown in FIG. 6 as a FAT table entry 603, "EOF" representing end-of-file is marked on the FAT table entry for the last cluster "0x08" in which data "X" of the clip management file is recorded. Hereinafter, this stage is referred to as [Stage 4].

Next, as [Stage 5], in a directory entry 601 for the video file, a cluster number "0x09", the number next to the end cluster "0x08" of the file management file, is recorded as the starting cluster number of the video file and the size of the data to be recorded "98304" is recorded as the file size.

Then, as [Stage 6], video data "V" is recorded from the cluster next to the end cluster of the clip management file. As a result, the entire allocation area 604 is treated as the video file.

Similarly, as shown in FIG. 7, in response to a request to write the audio data, first, as shown as a FAT table entry 703, as the end of FAT table entries for the video file, "EOF" is marked on the FAT table entry for the last cluster "0x0B" in which the data "V" of the video file is recorded. This stage is [Stage 7].

Next, as [Stage 8], in a directory entry 702 for the audio file, a cluster number "0x0C", the number next to the end cluster "0x0B" of the video file, is recorded as the starting cluster number of the audio file and the size of the data to be recorded "32768" is recorded as the file size.

Then, as [Stage 9], audio data "A" is recorded from the cluster "0x0C" next to the end cluster "0x0B" of the video file. As a result, the entire allocation area 704 is treated as the audio file.

Through the recording start process and the subsequent recording process as described above, the clip management file, the video file and the audio file are recorded on the recording medium 150.

According to the recording method of the present embodiment, even when data recording is interrupted due to a power stoppage, etc., the data recorded up to the interruption can be read out, so that a loss of data can be avoided. With regard to this reason, [Stage 1] to [Stage 9] each will be described specifically.

First, when a power stoppage, etc., takes place in [Stage 1], a loss of data does not occur because the data has not been recorded. In this case, since the directory entry that shows the cluster number of the allocation area 503 shown in FIG. 5 does not exist, the area 503 is to remain as a floating FAT chain.

When a power stoppage, etc., takes place in [Stage 2], a loss of data does not occur also in this stage because the data has not been recorded. In this case, since the allocation area 503 is treated as the clip management file, undefined data that has been recorded on the recording medium 150 is to be referenced as the clip management file.

When a power stoppage, etc., takes place in [Stage 3], since the directory entry 500 for the clip management file is recorded and the data "X" of the clip management file has been already recorded in the cluster corresponding to the FAT table entry "0x09", the recorded data can be referenced as a file. In this case, the entire allocation area 503 up to the cluster whose entry is marked with the end mark "EOF" is treated as the clip management file. Thus, undefined data that has been recorded on the recording medium 150 is to be referenced as the clip management file.

When a power stoppage, etc., takes place in [Stage 4], the clip management file can be referenced as a normal file that contains no undefined data. Further, a loss of data does not occur because the video data has not been recorded. In this case, since the directory entry that shows the cluster number of the allocation area 604 shown in FIG. 6 does not exist, the area 603 is to remain as a floating FAT chain.

When a power stoppage, etc., takes place in [Stage 5], a loss of data does not occur because the video data has not been recorded. In this case, the allocation area 604 is to be treated as the video file and undefined data is to be referenced as the video data file.

When a power stoppage, etc., takes place in [Stage 6], since the directory entry 601 for the video file is recorded and the data "V" of the video file is already recorded in the clusters corresponding to the FAT table entry "0x0A" and beyond, the recorded data can be referenced as a file. In the case shown in FIG. 6 as an example, the clusters in the area 604 following the clusters "0x09" to "0x0B" in which the data is recorded, in other words, the clusters "0x0C" to "0x0F" are also treated as the video file. Thus, undefined data recorded in this area is to be referenced as the video file.

When a power stoppage, etc., takes place in [Stage 7], the video file can be referenced as a normal file that contains no undefined data. Further, a loss of data does not occur because the audio data has not been recorded yet. Since the directory entry that shows the cluster number of the allocation area 704 shown in FIG. 7 does not exist, the area 704 remains as a floating FAT chain.

When a power stoppage, etc., takes place in [Stage 8], a loss of data does not occur because the audio data has not been recorded. In this case, the allocation area 704 is to be treated as the audio file and undefined data is to be referenced as the audio file.

When a power stoppage, etc., takes place in [Stage 9], since the directory entry 702 for the audio file is recorded and the data "A" of the audio file already is recorded in the clusters corresponding to the FAT table entry "0x0D" and beyond, the recorded data can be referenced as a file. In the case shown in FIG. 7 as an example, the clusters in the area beyond the cluster "0x0C" in which the data is recorded, in other words, the clusters from "0x0D" to "0x0F" whose FAT table entry is marked with "EOF" are also treated as the audio file. Thus, undefined data recorded in this area is to be referenced as the audio file.

As described above, according to the recording method of the present embodiment, even when data recording is interrupted due to a power stoppage, etc., in any of [Stage 1] to [Stage 9], data recorded up to the interruption of recording can be read out, so that a loss of data can be avoided.

Next, as an example of the recording process presented at step S202 in the recording method of the present embodiment shown in FIG. 2, with reference to a flow chart of FIG. 8, a description will be given on a procedure of a recording process when video shooting further is performed by the user and recording of video and audio files is performed subsequent to the recording process shown in FIG. 3.

Figure 8:
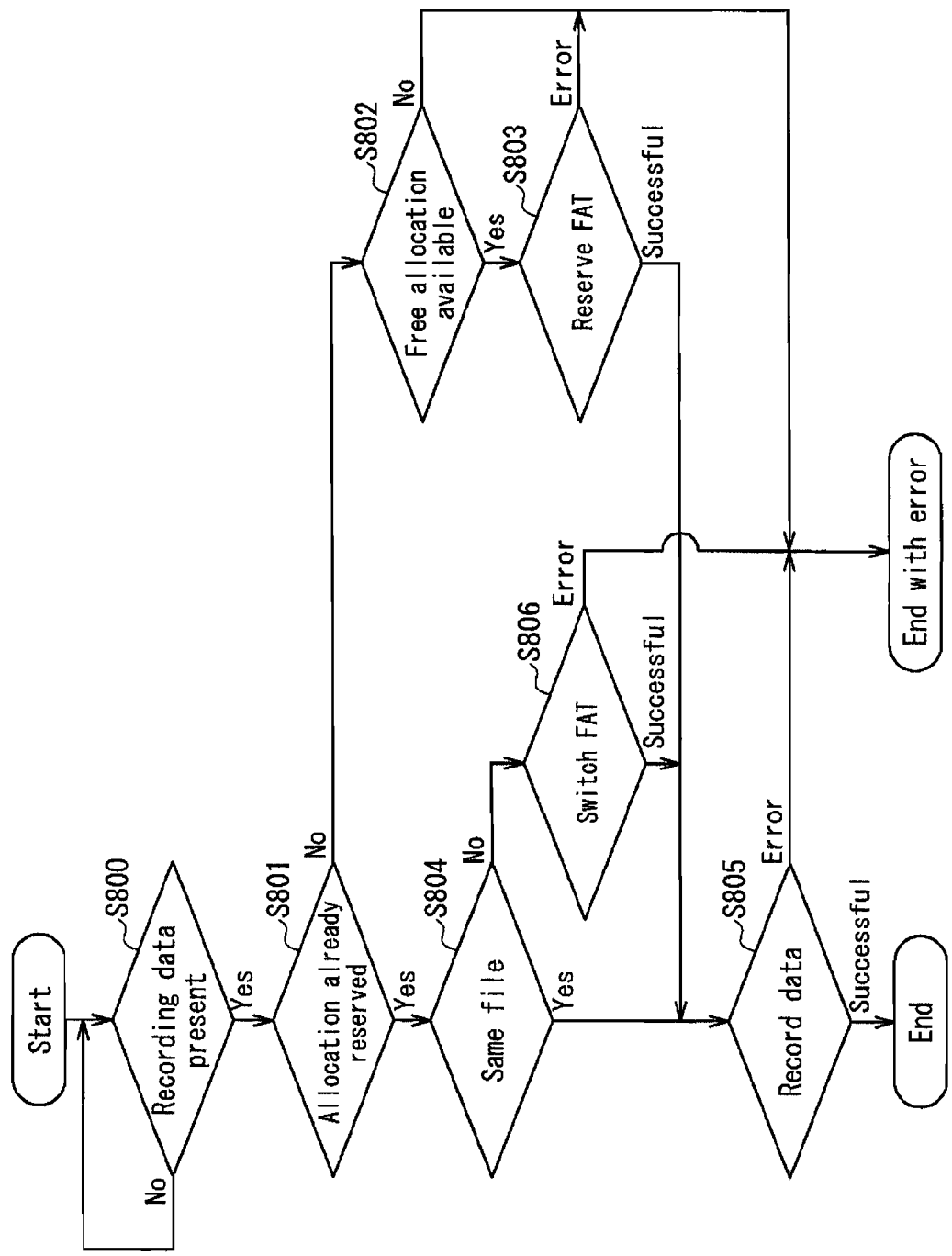
FIG. 8 is a flowchart showing details of the recording process in the recording method according to one embodiment.

FIG. 8 is a flowchart showing the procedure of the recording process at the time of recording additional video file data and audio file data when the management file data "X", the video file data "V" and the audio file data "A" have been recorded on the recording medium 150 in the state shown in FIG. 7.

First, as shown in FIG. 8, the system control unit 110 checks whether or not encoded data is stored in the recording buffer (not shown) at the first step S800.

When encoded data is stored, the system control unit 110 converts the encoded data to a predetermined format through the clip recording device 111. The procedure advances to step S801 and the recording process starts.

At step S801, the system control unit 110 checks whether or not allocation in which the data is to be recorded has already been reserved.

If not, the procedure advances to step S802. On the other hand, when the allocation has been reserved, the procedure advances to step S804.

At step S802, the system control unit 110 detects, through the free space searching device 112, whether there is free allocation or not.

When there is no free allocation, the system control unit 110 sets an error code and ends the process. On the other hand, when free allocation is detected, the procedure advances to step S803.

At step S803, the system control unit 110 pre-reserves the FAT table for the free allocation detected at step S802.

When the FAT table has been pre-reserved successfully, the procedure advances to step S805, at which the system control unit 110 records the data and ends the process.

On the other hand, when the FAT table has not been pre-reserved successfully at step S803 or an error, such as a problem with the recording medium 150, occurs during the data recording at step S805, the system control unit 110 sets an error code and ends the process.

When the allocation in which the data is to be recorded has been reserved at step S801, the system control unit 110 checks whether or not the type of file of the data to be recorded is the same as that of previously recorded data.

When the file type is the same as that of the previously recorded data, since a FAT chain has already been reserved, the procedure advances to step S805, at which the system control unit 110 records the data and ends the process. When an error, such as a problem with the recording medium, occurs during the data recording, the system control unit 110 sets an error code and ends the process.

On the other hand, when the file type is different from that of the previously recorded data, the procedure advances to step S806.

At step S806, the system control unit 110 switches FAT chains.

When the switching of FAT chains has been carried out successfully, the procedure advances to step S805, at which the system control unit 110 records the data and ends the process.

When the switching of FAT chains has ended in failure or an error, such as a problem with the recording medium, occurs during the data recording at step S805, the system control unit 110 sets an error code and ends the process.

In this way, the data of each of the video file and the audio file is recorded following the procedure shown in FIG. 8.

Figure 9:
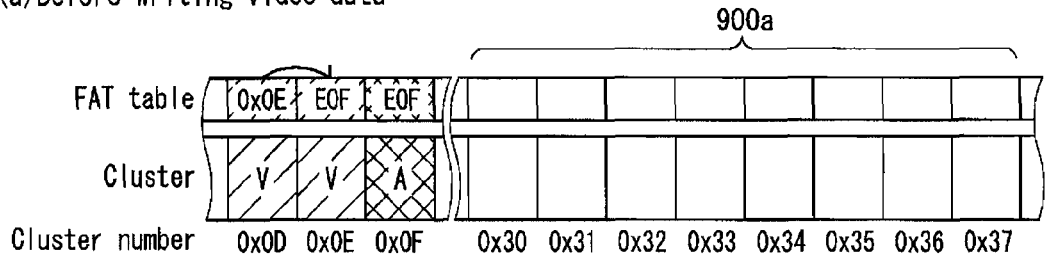
FIG. 9 is an explanatory diagram showing pre-reservation of the FAT table in the recording method according to one embodiment.
Figure 9:
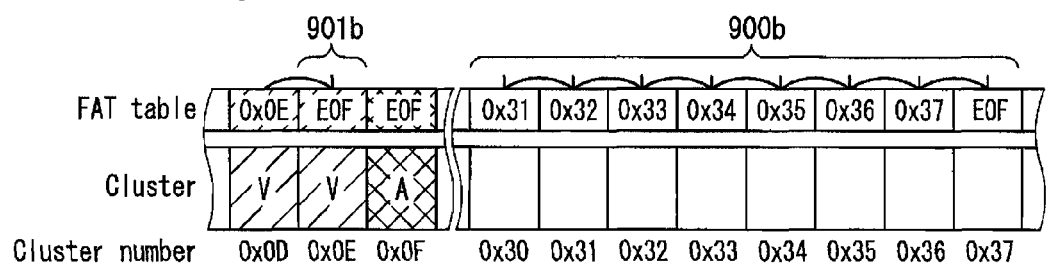
Figure 9:
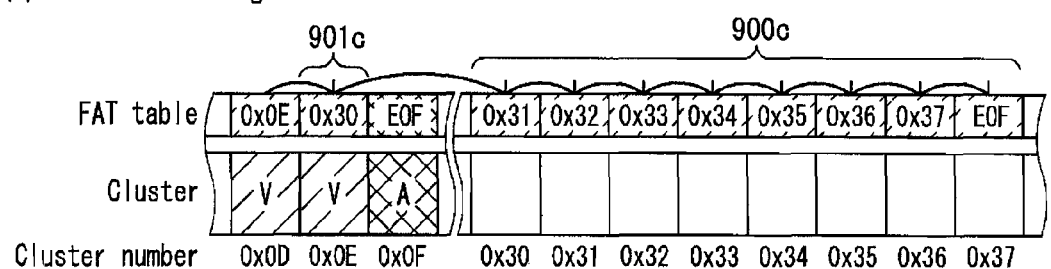
Figure 9:
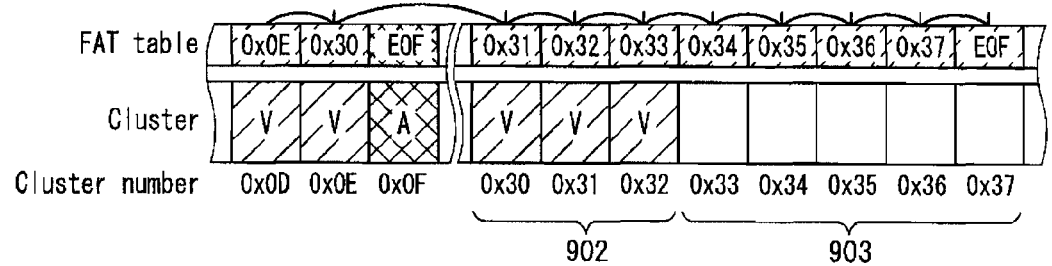
Figure 10:
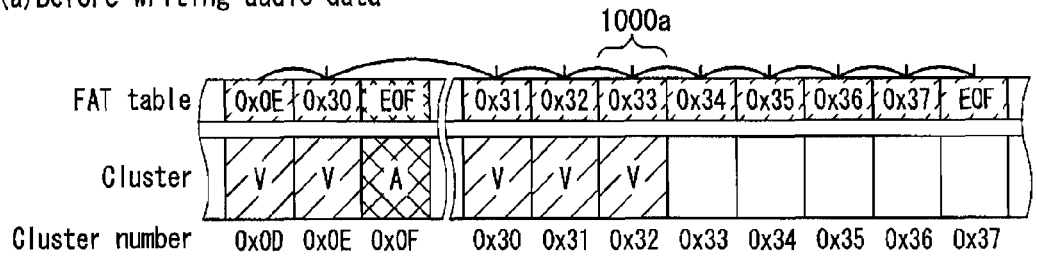
FIG. 10 is an explanatory diagram showing switching of FAT chains in the recording method according to one embodiment.
Figure 10:
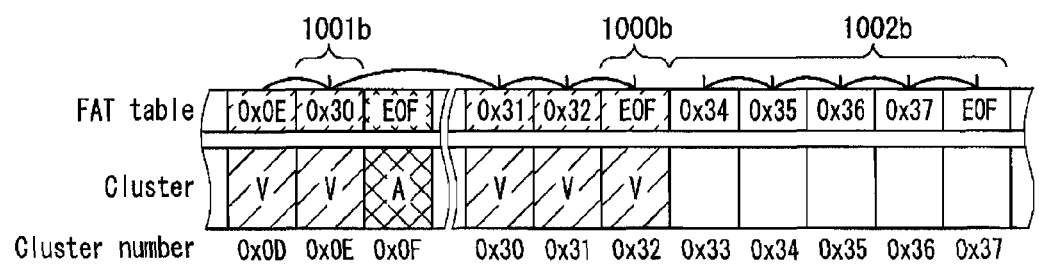
Figure 10:
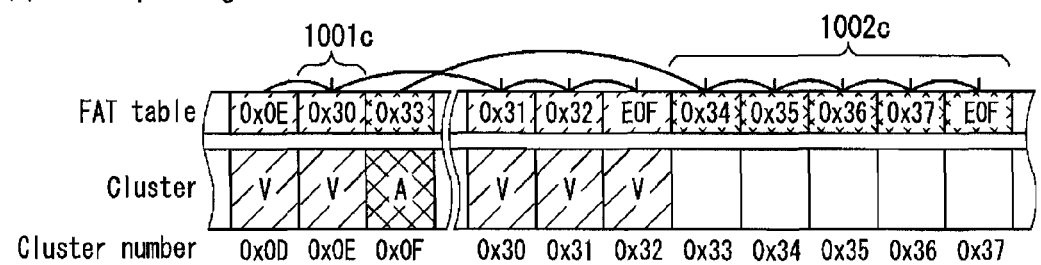
Figure 10:
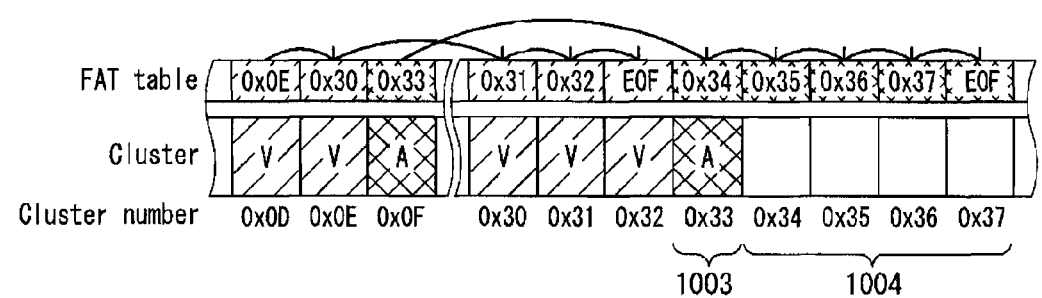

Here, relative to the recording of video file data and audio file data shown in the flowchart of FIG. 8, with reference to FIGS. 9 and 10, a description will be given on specific examples of the states of the FAT table and clusters for the allocation in which the data is recorded. In the present embodiment, the directory entries are not updated at the time of recording new video and audio files on the recording medium as a result of additional video shooting when the video file data and the audio file data have already been recorded on the recording medium 150, as shown in the flowchart of FIG. 8. Thus, a description of the update will be omitted.

FIGS. 9(a) to 9(b) show a specific example of pre-reservation of the FAT table, which is performed when writing the video file data on the recording medium 150. The drawings show the states of the FAT table and clusters in each stage.

As shown in FIG. 9(a), a free allocation area 900a detected at step S802 is free space before writing the video data.

As shown in FIG. 9(b), in response to a request to write the video data, as the pre-reservation of the FAT table, FAT table entries from one for the top of the allocation area 900a detected at step 802 are connected to each other in sequence to form an allocation area 900b. Further, "EOF" representing end-of-file is marked on the FAT table entry for the last cluster (cluster number "0x37") of the allocation area 901b. At this stage, "EOF" representing end-of-file is marked on a FAT table entry 901b for the last cluster (cluster number "0x0E") of the allocation for the previously recorded video file. Hereinafter, this stage will be referred to as [Stage 10].

Next, as [Stage 11], as shown in FIG. 9(c) as a FAT table entry 901c, the FAT table entry for the end of the FAT chain for the previously recorded video file is reset to indicate the cluster number "0x30" of the first cluster of the allocation area 900b. As a result, the allocation 901b reserved for new recording is connected to the FAT chain for the previously recorded video file to form allocation 901c. And this new allocation 901c can be referenced as a video file.

Next, as [Stage 12], as shown in FIG. 9(d) as an area 902, the video data is recorded in clusters from the first cluster "0x30" of the allocation 900c to the cluster "0x32". At the stage of FIG. 9(d), clusters beyond the cluster "0x33" form an area 903 in which no data is recorded.

In this way, when continuing to record video file data in a state where video file data and audio file data have already been recorded, by connecting newly detected and reserved free allocation to the last cluster of the allocation for the previously recorded video file data, it becomes possible to recognize a single sequential allocation where the same type of video files are recorded, and the data becomes easy to read out.

Next, as a specific example of recording of an audio file, the switching of FAT chains will be described with reference to FIG. 10.

FIG. 10(a) shows the state before writing audio data. The state of each cluster is the same as the state shown in FIG. 9(d) in which the state after writing the video data is shown. The cluster "0x32" in FIG. 10(a) is the last cluster of the allocation in which the video data is recorded. A FAT table entry 1000a for the last cluster indicates the next cluster "0x34" in the same allocation.

Next, in response to a request to write the audio data, as shown in FIG. 10(b) as a FAT table entry 1000b, the end "1000a" of the FAT chain for the previously recorded video file is reset to indicate "EOF" representing end-of-file. At this time, "EOF" representing end-of-file is marked on the FAT table entry for the cluster "0x0F" in which audio data is previously recorded. Further, an allocation area 1002b in which no video file is recorded remains as free space. The stage shown in FIG. 10(b) will be referred to as [Stage 13].

Next, as [Stage 14], as shown in FIG. 10(c), the FAT table entry for the last cluster "0x0F" in which the audio data is previously recorded is reset to indicate "0x33" from "EOF" representing end-of-file in order to indicate the top of an allocation area 1002c for newly recording audio data. In this way, by switching the FAT chain for recording a video file to the FAT chain for recording an audio file, from then on, the allocation area 1002c can be referenced as an audio file.

Next, as [Stage 15], as shown in FIG. 10(d), the audio file data is recorded from the first cluster of the free allocation 1002 for recording the audio file shown in FIG. 10(c). FIG. 10(d) shows a state where audio data is recorded in a single cluster "0x33" shown as the area 1003 as the audio file, and the remaining of the free allocation area 1004 remains as blank.

In this way, when recording an audio file subsequent to recording a video file, by switching from the FAT chain provided for recording the video file to the FAT chain for recording the audio file, the audio file can be referenced as data recorded in the same FAT chain continued from the previously recorded audio data.

The recording process at the time of additionally recording the video file data and the audio file data in the recording method of the present embodiment has been described. According to such a recording method, even when recording of video data or audio data is interrupted due to a power stoppage, etc., the data recorded up to the interruption of recording can be read out, so that a loss of data can be avoided. With regard to this reason, [Stage 10] to [Stage 15] each will be described specifically.

First, when a power stoppage, etc., takes place in [Stage 10], a loss of data does not occur because the video data has not been recorded. In this case, since a directory entry showing the cluster number of the allocation area 900b shown in FIG. 9(b) does not exist, the area 903b is to remain as a floating FAT chain.

Next, even when a power stoppage, etc., takes place in [Stage 11], a loss of data does not occur because the video data has not been recorded. In this state, the area of the allocation 900c is treated as the video file and undefined data that has been originally recorded on the recording medium 150 is to be referenced as a file.

When a power stoppage, etc., takes place in [Stage 12], the recorded video data can be referenced as a file. The contents of clusters in the allocation area 903 other than those in which the data is recorded are also treated as the video file, and undefined data is to be referenced as a file.

When a power stoppage, etc., takes place in [Stage 13] at which the audio file data is recorded, the video file can be referenced as a normal file that contains no undefined data. Further, a loss of data does not occur because the audio data has not been recorded. In this case, since a directory entry showing the cluster number of the area 1002b does not exist, the area 1002b remains as a floating FAT chain.

When a power stoppage, etc., takes place in [Stage 14], a loss of data does not occur because the audio data has not been recorded. The allocation area 1002c is treated as the audio file, and undefined data is to be referenced as a file.

When a power stoppage, etc., takes place in [Stage 15], the recorded audio data can be referenced as a file. The area 1004 other than the cluster area 1003 in which the data is recorded also is treated as the audio file, and undefined data that has been recorded is to be referenced as a file.

In the recording method of the present embodiment, directory entries are not updated during the recording process. Thus, the file size recorded in the directory entry for each of the management data file, the video file and the audio file indicates the same value that is recorded in the recording start process. In this case, even when a power stoppage, etc., occurs, each file size can be estimated by tracing each FAT chain. The details thereof will be described later.

Next, with reference to the drawings, the recording stop process presented as step S203 in the recording method of the present embodiment shown in FIG. 2 will be described in detail.

Figure 11:
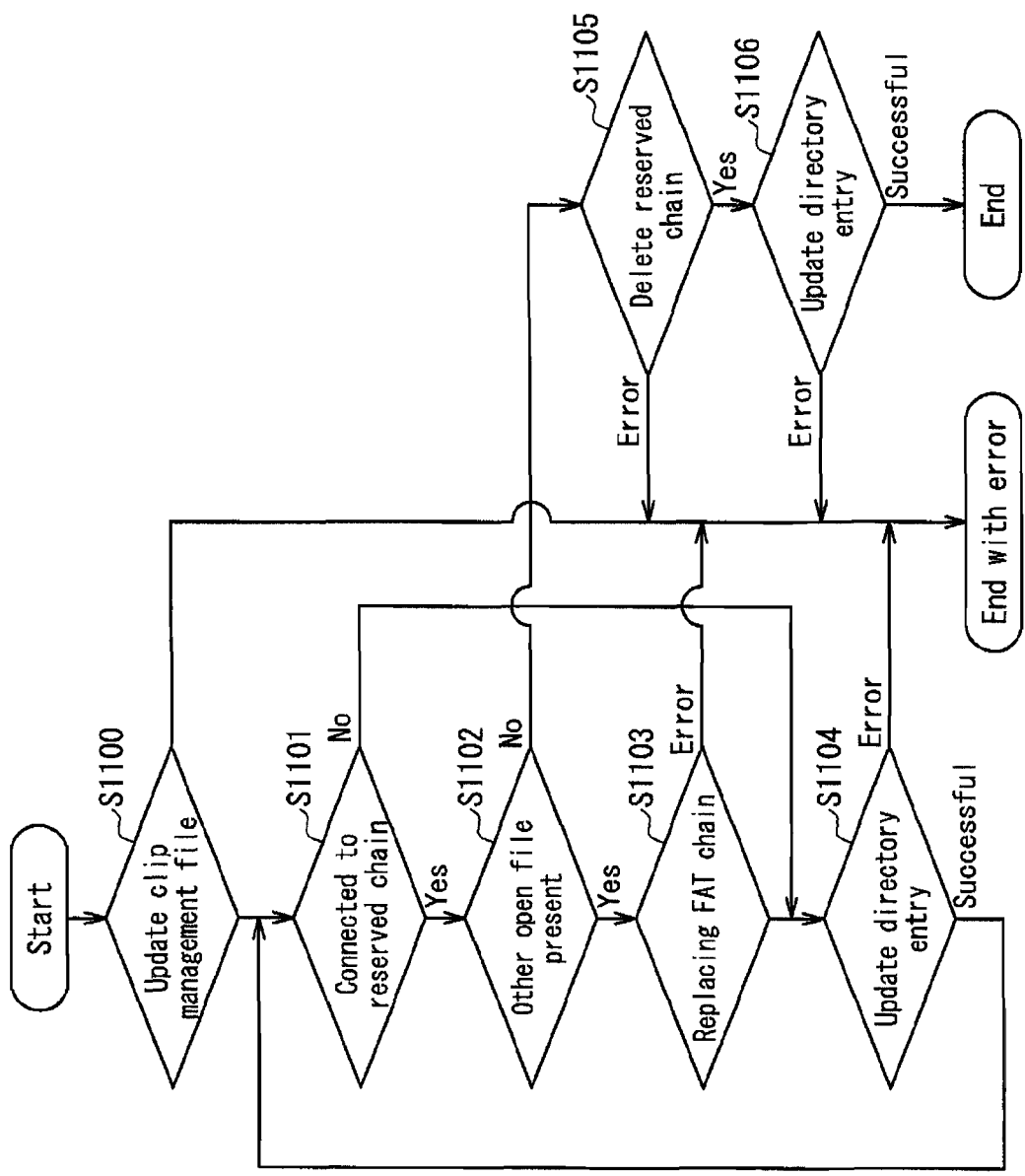
FIG. 11 is a flowchart showing details of a recording stop process in the recording method according to one embodiment.

FIG. 11 is a flowchart showing details of the recording stop process in the recording method of the present embodiment.

As shown in FIG. 11, in the recording stop process, the system control unit 110 updates the clip management file at the first step S1100. Specifically, the system control unit 110 sets the duration indicating the number of frames of the clip, sets the date and time of stop of recording, and closes the file. At this time, since the clip management file is to be overwritten, the system control unit 110 does not update the FAT table. The system control unit 110 records the directory entry so as to change the date and time of update of the directory entry.

When an error, such as a problem with the recording medium, occurs during the update of the clip management file, the system control unit 110 sets an error code and ends the process.

When the update of the clip management file has been carried out successfully, the procedure advances to step S1101.

At step S1101, the system control unit 110 checks whether or not the file to be closed is connected to a reserved chain, in other words, checks whether or not the file is one for which the FAT table is pre-reserved. Since undefined data is referenced as a file when the file to be closed is connected to a reserved chain, this measure is taken to prevent such a problem from occurring.

When the file to be closed is connected to a reserved chain, the procedure advances to step S1102. If not, the procedure advances to step S1104.

At step S1102, the system control unit 110 checks whether or not there is an open file other than the file to be closed.

When there is an open me other than the file to be closed, the procedure advances to step S1103. When there is no open file other than the file to be closed, the procedure advances to step S1105.

At step S1103, the system control unit 110 performs FAT chain replacement in which the FAT chain of the file to be closed connected to the reserved chain is replaced with that of the other open file.

When an error occurs at this time, the system control unit 110 sets an error code and ends the process. When the FAT chain replacement has been carried out successfully, the procedure advances to step S1104.

At step S1104, the system control unit 110 updates the directory entry. At this step, the system control unit 110 records the size of the actually recorded data in the directory entry as the file size, and at same time, updates the date and time of the change.

When an error occurs at this time, the system control unit 110 sets an error code and ends the process. When the update of the directory entry has been carried out successfully, the procedure advances to step S1101 for closing other open file.

At step S1102, when there is no open file other than the file to be closed, the system control unit 110 deletes the reserved chain at step S1105.

When an error occurs during the deletion of the reserved chain, the system control unit 110 sets an error code and ends the process. When the reserved chain has been deleted successfully, the procedure advances to step S1106.

At step S1106, the system control unit 110 updates the directory entry. At this step, the system control unit 110 records the size of the actually recorded data in the directory entry as the file size and updates the date and time of the change.

When an error occurs at this time, the system control unit 110 sets an error code and ends the process. When the update of the directory entry has been carried out successfully, the system control unit 110 ends the process successfully.

In this way, the recording end process in the recording method of the present embodiment shown in the flowchart of FIG. 2 is completed.

Here, with respect to the FAT chain replacement at step S1103 and the deletion of the reserved chain at step S1105 in the recording end process shown in FIG. 11, a description will be given by illustrating specific examples.

Figure 12:
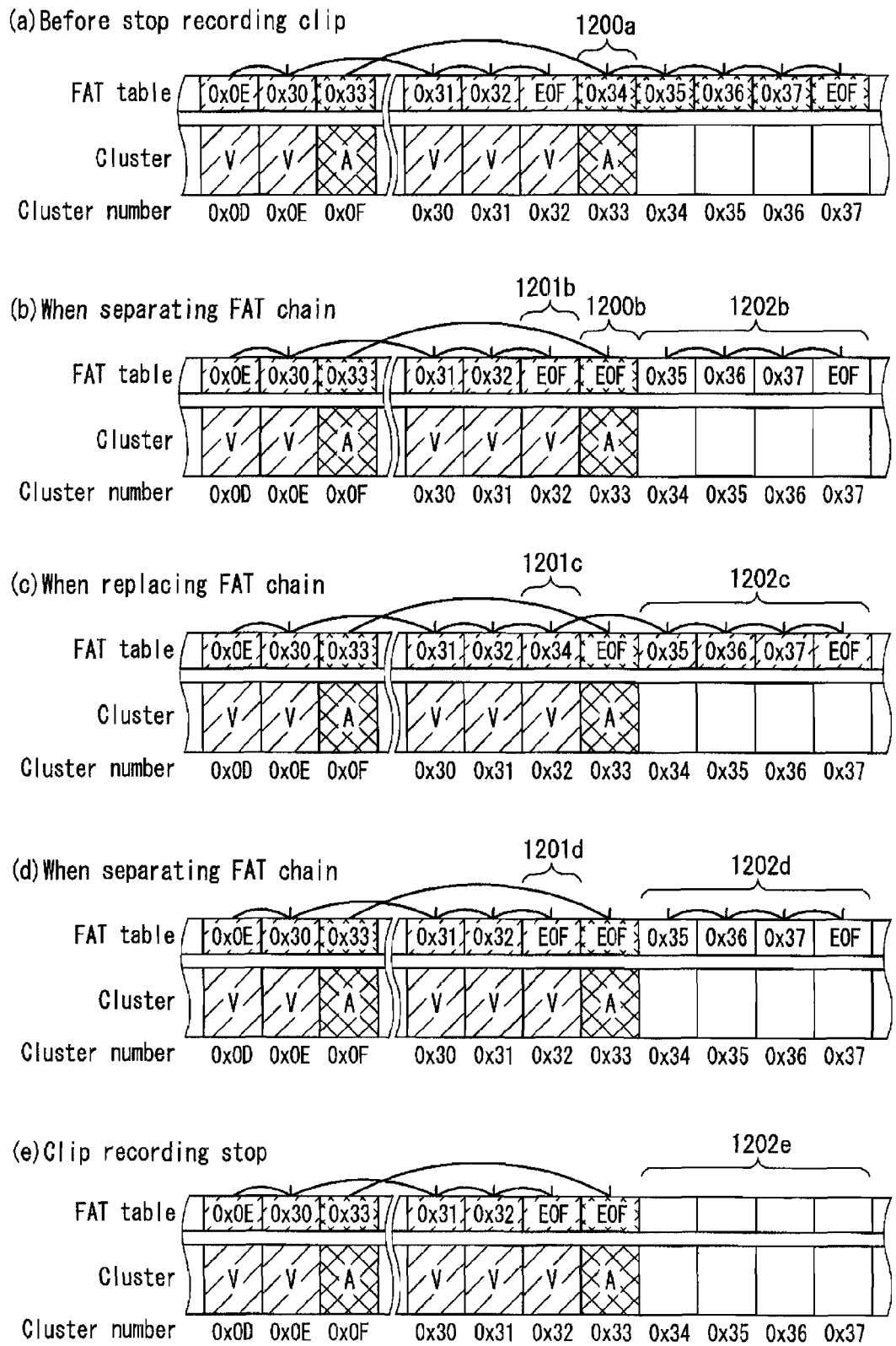
FIG. 12 is an explanatory diagram showing a clip recording stop process in the recording method of one embodiment.

FIG. 12 is a diagram showing specific examples of the states of the FAT table and clusters for the allocation in which data is recorded. The drawings correspond to FIGS. 9 and 10, which show the recording process in the flowchart of FIG. 8 in detail.

FIG. 12(a) shows the state shown in FIG. 10(d), where writing of the audio data has ended. At this stage, although a FAT table entry 1200a for the cluster "0x33" in which the audio data is recorded is connected to the next cluster "0x34", no data is recorded in clusters beyond the cluster "0x34" that are connected to each other through a FAT chain.

Next, as shown in FIG. 12(b), the FAT chain is separated. Specifically, the FAT table entry 1200a for the last cluster in which the audio data is actually recorded is changed to a FAT table entry 1200b marked with "EOF" representing end. As a result of the separation, the FAT chain for recording the audio file ends. This stage will be referred to as [Stage 16].

Next, as [Stage 17], as shown in FIG. 12(c), the FAT chain separated in FIG. 12(b) is replaced with other open file, in this case with the video file. That is, a FAT table entry 1201b for the end cluster assigned to the previously recorded video file and marked with "EOF" representing end is changed to a FAT table entry 1201c for the first cluster "0x34" of the FAT chain separated from the audio file. As a result, as shown in FIG. 12(c), the area 1202c is treated as the video file, and video data can be recorded continuously.

In the FAT chain replacement at step S1103, when there may be a plurality of other open files, the order in which the replacement is performed for the files is set in advance, such as performing the replacement in the order of files being opened.

Next, the deletion of the reserved chain at step S1105 will be described with reference to FIG. 12(c) and beyond.

As shown in FIG. 12(c), in response to a request to end recording of the audio file, FAT chains are switched. And in the state where a video file can be recorded, closing of the video file is requested as the recording end process.

And as the subsequent [Stage 18], as shown in FIG. 12(d), the FAT table entry 1201c for the last cluster actually assigned to the video data, the entry connected to the reserved chain in [Stage 17] and marked with "0x34", is changed to a FAT table entry 1201d marked with "EOF" representing end. As a result, an unused cluster area 1202d is separated from the video file recording area.

Next, as [Stage 19], all of the clusters in the unused cluster area 1202d separated from the video file are set as unused by tracing the FAT chain in sequence, and the cluster area 1202d is set as an unused cluster area 1202e. As a result, the cluster area 1202e is recognized as an unused area, so that the area is prevented from remaining as a floating FAT chain.

By performing such a recording end process, even when the recording end process is interrupted due to a power stoppage, etc., the recorded data can be read out, so that a loss of data can be avoided. With regard to this reason, [Stage 16] to [Stage 19] each will be described specifically.

First, when a power stoppage, etc., takes place in [Stage 16], the audio file can be referenced as a normal file that contains no undefined data. Further, since the video file includes a FAT table entry marked with "EOF" correctly representing end, it can also be referenced as a normal file that contains no undefined data. In FIG. 12(b), since a directory entry showing the cluster number shown as the area 1202b does not exist, the area 1202b remains as a floating FAT chain.

Next, when a power stoppage, etc., takes place in [Stage 17], the area shown as the area 1202c in FIG. 12(c) is treated as the video file, and undefined data is referenced as a file. However, data in the clusters up to the cluster "0x34" in which the video data is originally recorded can be correctly referenced as the video file, a situation, such as unable to read the data, does not occur.

When a power stoppage, etc., takes place in [Stage 18], the video data can be referenced as a normal file that contains no undefined data. With regard to the area shown as the area 1202d in FIG. 12(d), the area separated from the FAT chain of the audio file, since a directory entry showing the cluster number of this area does not exist, the area is to remain as a floating FAT chain.

When a power stoppage, etc., takes place in [Stage 19], both the video file and the audio file can be referenced as normal files that contain no undefined data.

As described above, according to the recording method of the embodiment of the present invention, even when data recording is interrupted due to the occurrence of an unexpected event, such as a power stoppage or a removal of a recording medium, during any of the file recording start process, the data recording process and the data recording end process, data that has been recorded before the interruption of recording can be referenced and a trouble of losing data can be avoided.

In the recording method of the present embodiment, it has been described that, by dividing each processing into [Stage 1] to [Stage 19], the data recorded in each of the stages can be referenced. It has also been described that, in some of the stages, situations, such as inconsistency between the size of recorded data and the file size in a directory entry, inclusion of undefined data in a file and floating FAT chain remaining, may occur. However, these situations are not be problems for the recording method of the present invention, and they can be solved easily through the following processes.

That is, with regard to the problem that the size of actually recorded data and the file size in a directory entry vary from each other, the size of the actually recorded data can be calculated easily by tracing the FAT chain in which the data is recorded. Specifically, the file size can be calculated by counting the number of entries in the FAT table and multiplying the number of entries by the cluster size.

In this case, when the size of the recorded data is not a multiple of the cluster size, undefined data is included in the end cluster of the file. However, the undefined data can be removed by performing appropriate processing depending on recorded file formats. The removing of undefined data can be applied for removing undefined data when the undefined data is contained in a file or a floating FAT chain is remaining.

For example, since the clip management file is recorded in the XML format, undefined data can be removed by detecting the end tag and deleting data beyond the end tag. The data beyond the end tag is deleted by updating the file size in the directory entry to the data size up to the end tag, retaining the FAT chain for the clusters corresponding to the data size and deleting the FAT chain beyond the retained FAT chain.

DV-DIF (Digital Video Digital Interface Format) used as a file format for video and audio data is composed of 80 byte-length blocks called DIF blocks. Thus, redundant undefined data can be removed by detecting ID at every 80 bytes.

Unlike in the above case, even when undefined data cannot be removed based on the file system, since an undefined data area is likely to become noise when the data is reproduced as video or audio, it is possible to deal with this problem by removing the undefined data area with a non-linear editing function on a personal computer. Further, even when an undefined data area is coincidentally in previously captured video data or audio data, in other words, when the undefined data area is data in the same file format as the originally recorded data, it easily can be detected and removed by determining details of video or audio during non-linear editing.

As described above, according to the recording device and the recording method of the present embodiment, at the time of time-divisionally recording a plurality of files on a recording medium, the different types of files can be recorded in a reserved area in sequence as well as management information indicating the end can be immediately provided to files whose recording has been completed. As a result, even when data recording is suddenly interrupted, the contents of the data recorded immediately before the interruption can be referenced.

Further, in the recording device and the recording method of the present embodiment, when a file corresponding to a data row to be recorded already has been recorded in the data area, the recording control unit rewrites management information corresponding to an end of the already recorded file so as to continue from the reserved area and records the data row in the reserved area. Thus, at the time of recording a plurality of types of files repeatedly, it is possible to correlate files with the files that have already been recorded. As a result, even when recording is suddenly interrupted, file data that has been recorded immediately before the interruption can be referenced.

Moreover, when ending recording on the recording medium, the recording control unit rewrites management information corresponding to an end of the data row last recorded such that the file ends at the end and deletes the management information on the reserved area not used in data recording. Thus, it is possible to avoid having undefined data remain after data recording and the recording area of the recording medium can be used in the most effective manner.

Further, as described above, the system control unit 110 as the recording control device of the recording device of the present embodiment can be implemented through a computer such as a microcomputer or a special-purpose device with a built-in computer. Further, the function of each functional part, i.e., the clip recording device 111, the free space searing device 112 and the file system 113, is implemented by a CPU included in the computer executing a predetermined program. Thus, the effects of the recording device and the recording method of the present embodiment are comprehensible as effects of an embodiment of a program for functioning the computer as each functional part and a recording medium recording the program.

The recording device, the recording method and the program of the present embodiment have been described with reference to specific examples. However, the recording medium, recording method and program of the present embodiment are not limited to the specific examples described above.

For example, in the embodiment described above, although the recording device of a digital camcorder for recording video and audio data has been described as the recording device, it can be implemented as various recording devices such as a driving information recording device for recording a plurality of types of data such as driving speed and history of emergency break usage.

The number of the data rows to be recorded also is not limited to two as in the embodiment described above, where video and audio data are recorded, and the recording device, the recording method and the program can be implemented to record three or more data rows. In that case, when recording a third data row or even more data rows in addition to the first data row as the first file and the second data row as the second file in the embodiment, after finished processing the second data row, the third data row is processed in a similar manner, and thereafter, a plurality of data rows can be recorded in sequence through the same procedure.

When recording a plurality of data rows, it is not necessary for the recording control unit to record all of the data rows in the same order. For example, when it is clear that data is not present in some data row, the recording control unit can skip recording of that data row and record data of other data row.

Although the FAT file system has been used as the file system in the embodiment described above, other file system, such as ext2 (second extended file system), can be used.

Further, in the embodiment of the recording method of the present invention, a case where continuous free space is detected as detection of free allocation to record new data in this space has been described as an example. However, the recording method of the present invention is not limited this example and a similar processing can be performed by detecting a certain number of discontinuous free clusters.

Further, in the embodiment described above, a case where directory entries are not updated during the recording process has been described as an example, but directory entries may be simultaneously updated every time the recording process for recording data is performed.

The recording device, recording method and program of the present invention are industrially applicable as a recording device, a recording method and a program for time-divisionally recording a plurality of files.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A recording device comprising:
a recording medium control unit for controlling recording and reproduction of data on a recording medium including a data area in which data rows can be recorded as files and a specific area in which management information for the files can be recorded, and
a recording control unit for time-divisionally recording, through the recording medium control unit, a first data row as a first file having a variable size and a second data row different from the first data row as a second file having a variable size,
wherein the recording control unit reserves an area in the data area, adds an end of file entry of the first file that references an end location of the first file in the reserved area as part of the management information, and then records the first data row in the reserved area in sequence as a first file from which the first data row can be referenced, and
wherein when switching from the first data row to the second data row for recording, the recording control unit rewrites the management information corresponding to the end of file entry of the first file to reference a new end location of the first file recorded in the reserved area immediately before the switching such that the first file ends at the new end location on the recording medium and records the second data row from a location subsequent to the new end location on the recording medium referenced by the end of file entry of the first file in the reserved area.

2. The recording device according to claim 1, wherein when a number of data rows to be recorded on the recording medium is 3 or more, the recording control unit time-divisionally records, after recording the second data row, a third data row, a fourth data row and beyond in sequence in a similar manner.

3. The recording device according to claim 1, wherein when a file corresponding to a data row to be recorded has been already recorded in the data area, the recording control unit rewrites management information corresponding to an end of file entry of the already recorded file so as to continue from the reserved area and records the data row in the reserved area.

4. The recording device according to claim 3, wherein when a number of data rows to be recorded on the recording medium is 3 or more, the recording control unit time-divisionally records, after recording the second data row, a third data row, a fourth data row and beyond in sequence in a similar manner.

5. The recording device according to claim 1, wherein when ending recording on the recording medium, the recording control unit rewrites management information corresponding to an end of file entry of a last recorded data row such that the file ends at a location of the reserved area referenced by the end of file entry of the last recorded data row and deletes the management information on the reserved area not used in data recording.

6. The recording device according to claim 5, wherein when a number of data rows to be recorded on the recording medium is 3 or more, the recording control unit time-divisionally records, after recording the second data row, a third data row, a fourth data row and beyond in sequence in a similar manner.

7. A recording method for time-divisionally recording, on a recording medium including a data area in which data rows can be recorded as files and a specific area in which management information for the files can be recorded, a first data row as a first file having a variable size and a second data row different from the first data row as a second file having a variable size, the method comprising:
reserving an area in the data area and recording the first data row in the reserved area in sequence as a first file from which the first data row can be referenced;
adding an end of file entry of the first file that references an end location of the first file in the reserved area as part of the management information; and
after adding the end of file entry of the first file as part of the management information, rewriting, when switching from the first data row to the second data row for recording, the management information corresponding to end of file entry of the first file to reference a new end location of the first file recorded in the reserved area immediately before the switching such that the first file ends at the new end location on the recording medium and recording the second data row from a location subsequent to the new end location on the recording medium referenced by the end of file entry of the first file in the reserved area.

8. The recording method according to claim 7, wherein when a number of data rows to be recorded on the recording medium is 3 or more, after the second data row is recorded, a third data row, a fourth data row and beyond are time-divisionally recorded in sequence in a similar manner.

9. The recording method according to claim 7, wherein when a file corresponding to a data row to be recorded has been already recorded in the data area, management information corresponding to an end of file entry of the already recorded file is rewritten so as to continue from the reserved area and the data row is recorded in the reserved area.

10. The recording method according to claim 9, wherein when a number of data rows to be recorded on the recording medium is 3 or more, after the second data row is recorded, a third data row, a fourth data row and beyond are time-divisionally recorded in sequence in a similar manner.

11. The recording method according to claim 7, wherein when ending recording on the recording medium, management information corresponding to an end of file entry of a last recorded data row is rewritten such that the file ends at a location of the reserved area referenced by the end of file entry of the last recorded data row and the management information on the reserved area not used in data recording is deleted.

12. The recording method according to claim 11, wherein when a number of data rows to be recorded on the recording medium is 3 or more, after the second data row is recorded, a third data row, a fourth data row and beyond are time-divisionally recorded in sequence in a similar manner.

13. A non-transitory recording medium storing a program for causing a computer to control a recording control unit for time-divisionally recording, on a recording medium including a data area in which a data row can be recorded as a file and a specific area in which management information for the file can be recorded, a first data row as a first file having a variable size and a second data row having a variable size different from the first data row as a second file,
wherein the recording control unit is caused to reserve an area in the data area, add an end of file entry of the first file that references an end location of the first file in the reserved area as part of the management information, and then to record the first data row in the reserved area in sequence as a first file from which the first data row can be referenced, and
wherein when switching from the first data row to the second data row for recording, the recording control unit is caused to rewrite the management information corresponding to the end of file entry of the first file to reference a new end location of the first file recorded in the reserved area immediately before the switching such that the first file ends at the new end location on the recording medium and to record the second data row from a location subsequent to the new end location on the recording medium referenced by the end of file entry of the first file in the reserved area.

14. The non-transitory recording medium storing a program according to claim 13, wherein when a number of data rows to be recorded on the recording medium is 3 or more, after the second data row is recorded, a third data row, a fourth data row and beyond are time-divisionally recorded in sequence in a similar manner.

15. The non-transitory recording medium storing a program according to claim 13, wherein when a file corresponding to a data row to be recorded has been already recorded in the data area, the recording control unit is caused to rewrite management information corresponding to an end of file entry of the already recorded file is rewritten so as to continue from the reserved area and to record the data row in the reserved area.

16. The non-transitory recording medium storing a program according to claim 15, wherein when a number of data rows to be recorded on the recording medium is 3 or more, after the second data row is recorded, a third data row, a fourth data row and beyond are time-divisionally recorded in sequence in a similar manner.

17. The non-transitory recording medium storing a program according to claim 13, wherein when ending recording on the recording medium, the recording control unit is caused to rewrite management information corresponding to an end of file entry of a last recorded data row such that the file ends at a location of the reserved area referenced by the end of file entry of the last recorded data row, and to delete the management information on the reserved area not used in data recording.

18. The non-transitory recording medium storing a program according to claim 17, wherein when a number of data rows to be recorded on the recording medium is 3 or more, a third data row, a fourth data row and beyond are time-divisionally recorded in sequence in a similar manner after recording the second data row.

19. The recording device according to claim 1, wherein the first data row is video data and the second data row is audio data.

20. The recording method according to claim 7, wherein the first data row is video data and the second data row is audio data.

21. The non-transitory recording medium storing a program according to claim 13, wherein the first data row is video data and the second data row is audio data.

* * * * *